May 28, 1957     D. RICHARDS     2,793,755
DRUM FILTER WITH REMOVABLE SECTIONS

Filed April 12, 1954     4 Sheets—Sheet 1

INVENTOR.
DWIGHT RICHARDS
BY
ATTORNEYS

May 28, 1957  D. RICHARDS  2,793,755
DRUM FILTER WITH REMOVABLE SECTIONS
Filed April 12, 1954  4 Sheets-Sheet 2
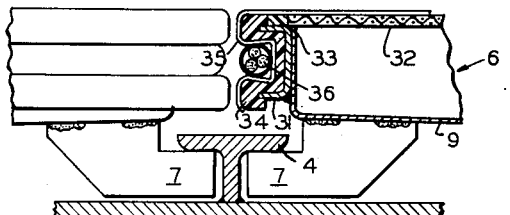
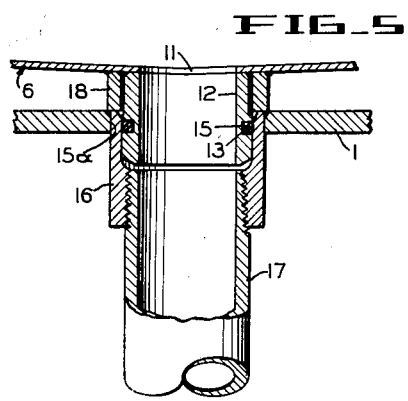
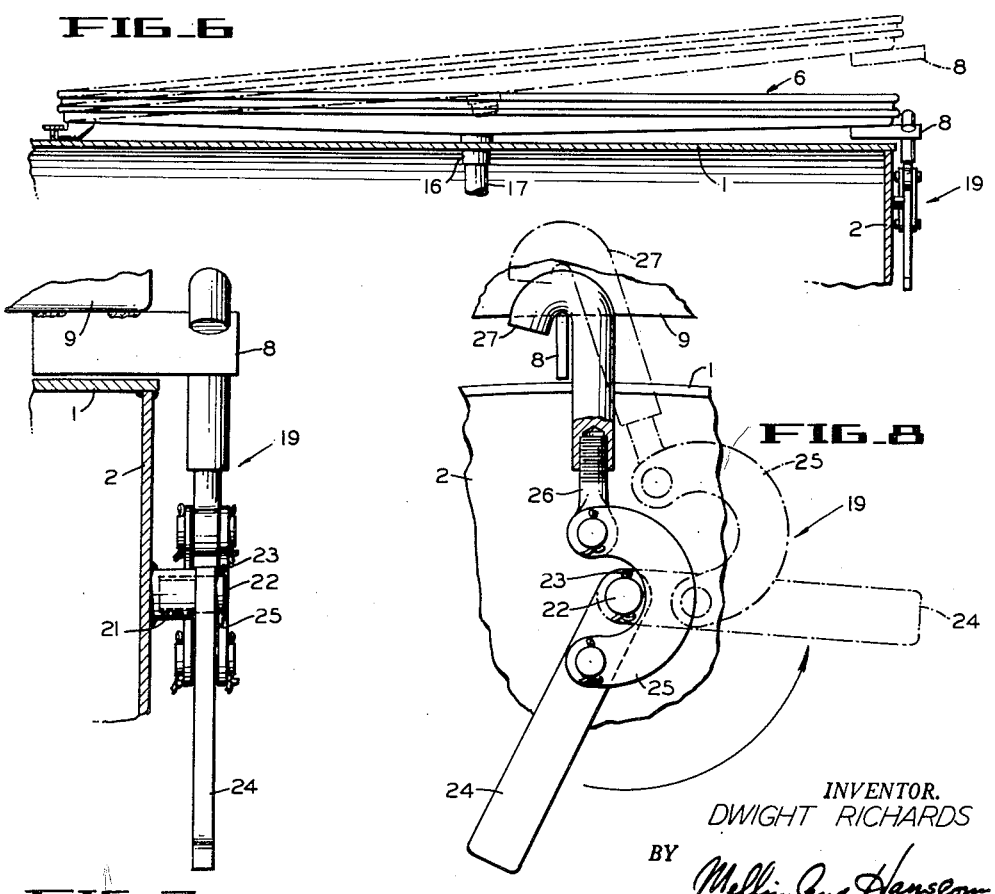
INVENTOR.
DWIGHT RICHARDS
BY
ATTORNEYS

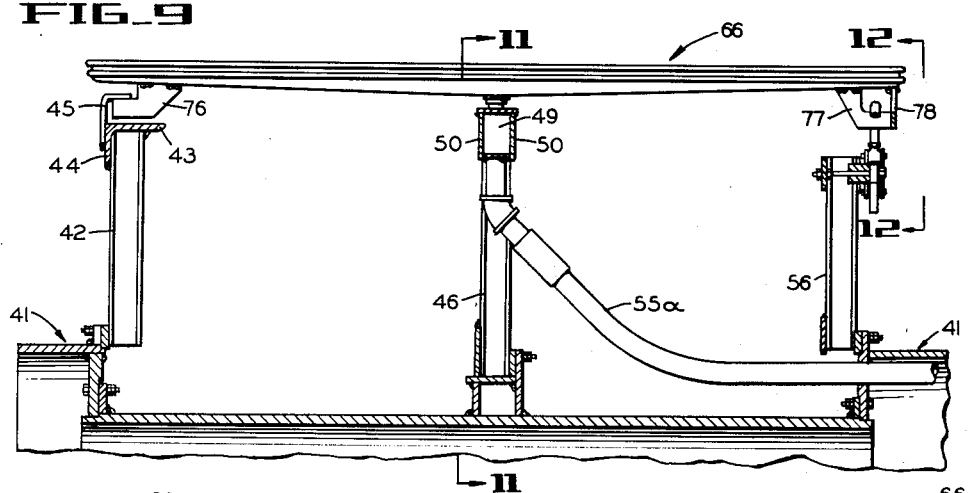
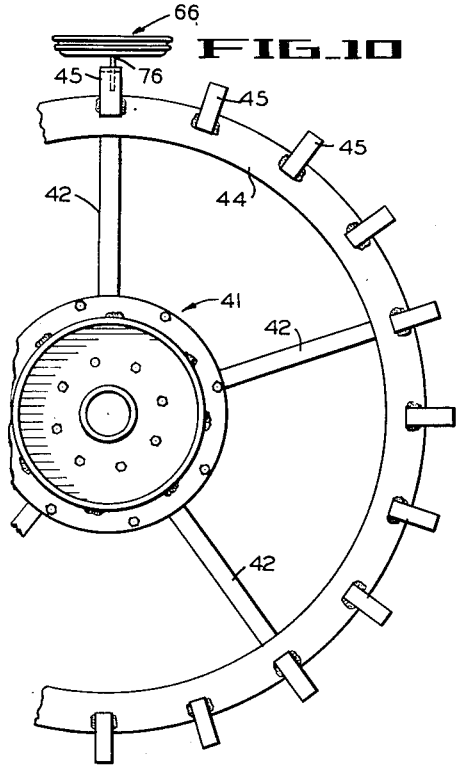
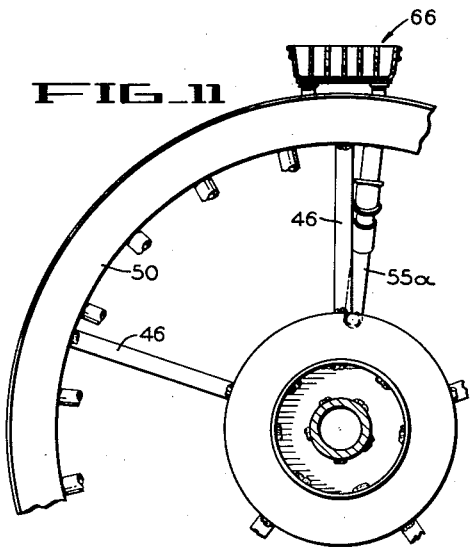

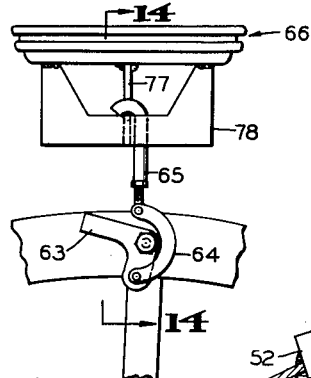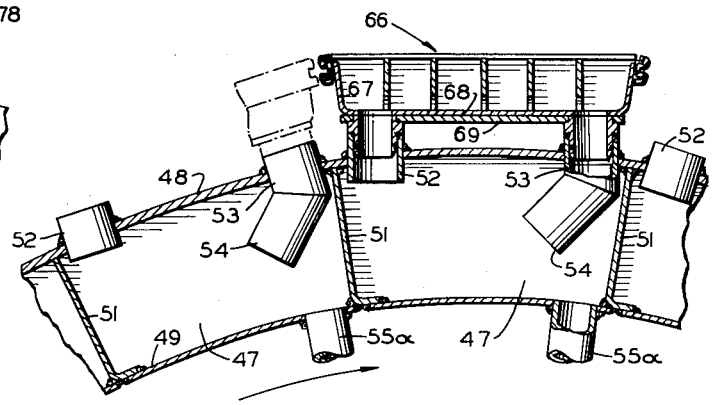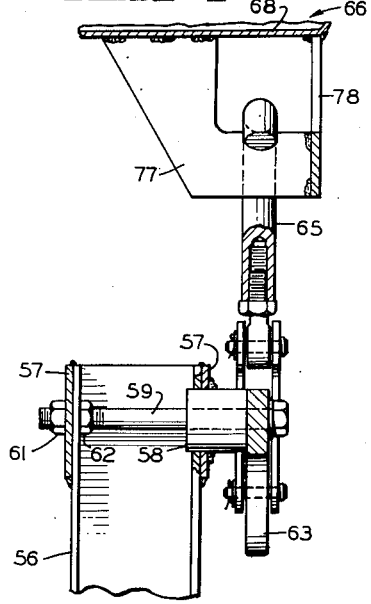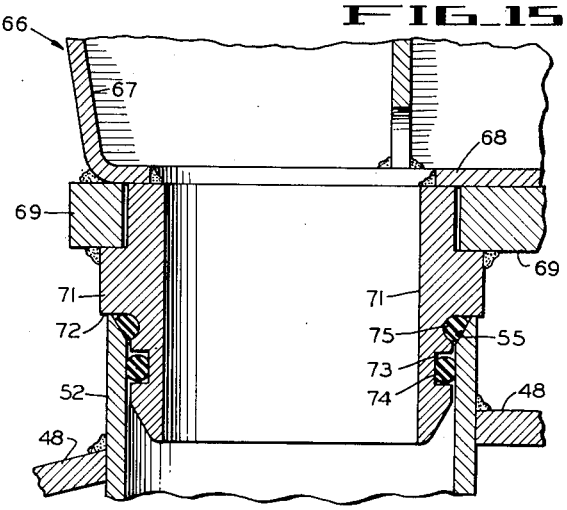

United States Patent Office 2,793,755
Patented May 28, 1957

2,793,755

DRUM FILTER WITH REMOVABLE SECTIONS

Dwight Richards, Orinda, Calif., assignor, by mesne assignments, to Dorr-Oliver Incorporated, Stamford, Conn., a corporation of Delaware Application April 12, 1954, Serial No. 422,505

5 Claims. (Cl. 210—330)

This invention relates to and in general has for its object the provision of a rotary filter drum made up of a plurality of parallel, contiguous, readily detachable and independent filtering pans.

Conventionally, the drum of a continuous rotary drum filter includes a cylindrical metal or wooden drum provided on its outer surface with a plurality of parallel, longitudinally extending, peripherally spaced slats or division strips. The drum and each adjacent pair of division strips form a filtrate compartment for the accommodation of a filter medium supporting screen. Disposed over this structure and secured to its division strips is a filter medium. The drum is supported by trunnions which in turn are journaled in bearings carried on the end of the filter tank or pan. Associated with one of the drum trunnions is an automatic filter valve communicating with each of the filtrate compartments through suitable piping accommodated within the drum.

Upon continued usage, the filter medium surrounding the drum becomes worn whereupon it becomes necessary to shut down the filter, remove the old cover and apply a new one. Not only is this laborious but the shutdown time is costly for frequently when the filter is shut down, the entire system associated therewith is likewise out of operation.

To obviate these objections, it is the object of this invention to provide a filter wherein its filtering drum is made up of independent and readily removable filtering pans so that upon the failure of the filtering medium at any point, the pan in question can be quickly removed and replaced by a spare pan previously provided with its filter medium. By resorting to this expedient, the duration of the shutdown time can be reduced to a minimum and in some cases, avoided altogether, for when the drum is rotating slowly, the required change can be made while the drum is in motion.

The invention possesses other advantageous features, some of which, with the foregoing, will be set forth at length in the following description where those forms of the invention which have been selected for illustration in the drawings accompanying and forming a part of the present specification, are outlined in full. In said drawings, two forms of the invention are shown, but it is to be understood that it is not limited to such forms, since the invention as set forth in the claims may be embodied in other forms.

Referring to the drawings:

Fig. 4 is an enlarged fragmentary view partly in section illustrating the manner in which the inner ends of the filter pans are detachably secured to their supporting structure.

Fig. 5 is an enlarged section taken through the filtrate connection between its pan and the piping communication with the automatic filter valve.

Fig. 6 is an enlarged vertical section taken through the filter drum along one edge of one of the filter pans, the disengaged position of the pan being illustrated in dot-dash lines.

Fig. 7 is an enlarged end elevation of the filter pan locking mechanism.

Fig. 8 is an enlarged side elevation of the locking mechanism illustrated in Fig. 7.

Fig. 9 is a half mid-vertical section taken through a modification of my invention wherein the filter pans are mounted on a pair of end rings rather than on a cylindrical shell.

Fig. 10 is a lefthand end elevation of the drum shown in Fig. 9.

Fig. 11 is a vertical mid-section taken on the section line 11—11 of Fig. 9.

Fig. 12 is an enlarged fragmentary end view taken on the line 12—12 of Fig. 9.

Fig. 13 is an enlarged, fragmentary, vertical, transverse mid-section taken through one of the filter pans and its associated filtrate collector.

Fig. 14 is an enlarged, fragmentary end elevation of the filter pan locking mechanism taken on the section line 14—14 of Fig. 12.

Fig. 15 is an enlarged detail in vertical section of the detachable connection between one of the filter pans and its filtrate outlet.

Figure 1:
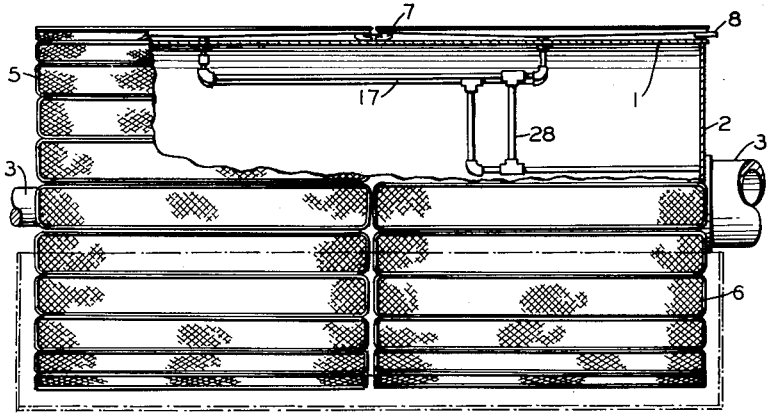
Fig. 1 is a side elevation of a filter embodying the objects of my invention, portions thereof being broken away better to illustrate its construction.
Figure 2:
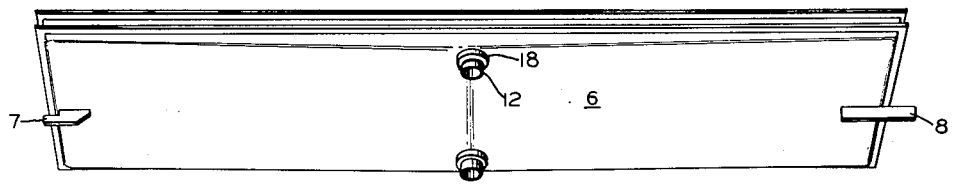
Fig. 2 is a perspective view of the bottom of one of the readily removable filter pans used in making up the drum shown in Fig. 1.
Figure 3:
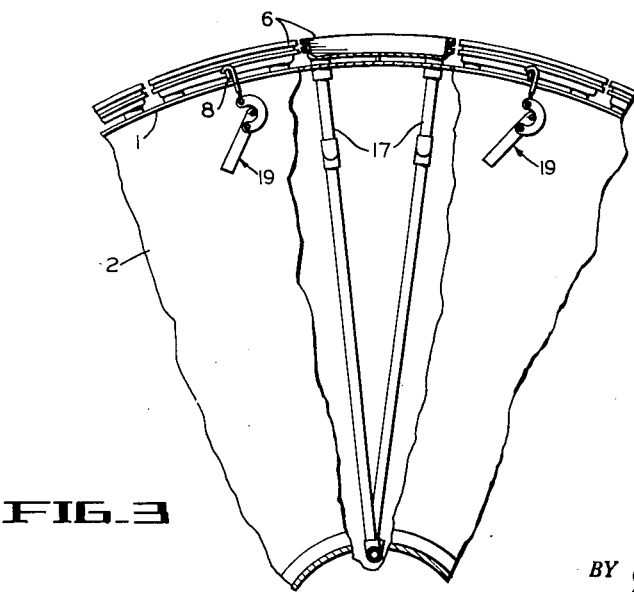
Fig. 3 is a fragmentary end view of the filter drum illustrated in Fig. 1.

The modification of my invention illustrated in Figs. 1 through 8 inclusive comprises a cylindrical drum supported at its ends by drum heads 2, these heads being mounted on trunnions 3. Welded to the outer face of the drum 1 intermediate its ends is a circular T-strip 4 (Fig. 4) and mounted over the entire surface of the drum are two contiguous rows of contiguous, identical, shallow and generally rectangular filter pans, the pans in the lefthand row as viewed in Fig. 1 being designated by the reference numeral 5 and the pans in the righthand row being designated by the reference numeral 6.

Welded to the bottom of the inner end of each pan centrally thereof is an undercut lug 7 arranged to be forced beneath the crossbar of the T-strip 4 with the adjacent end of the pan extending over the T-strip.

Welded to the bottom of the outer end of each of the pans 5 and 6 centrally thereof is an outwardly extending lug or finger 8, the height thereof being identical to the height of the lug 7.

Formed in the floor 9 of each pan 6 centrally thereof is a pair of transversely spaced filtrate discharge openings 11 and welded to the lower face of each pan about each of the openings 11 is a depending nipple 12 provided on its outer face with a channel 13. Accommodated in the channel 13 is a rubber or elastomer seal ring 15. Formed in the drum 1 in radial alignment with the nipple 12 is opening 15a and welded therein is a depending nipple 16, internally threaded at its lower end and arranged to receive one end of a filtrate manifold 17. As best shown in Fig. 5, the internal diameter of the upper portion of the nipple 16 is such as to snugly receive the nipple 12 with the sealing ring 15 in watertight engagement with the inner surface of the nipple 16. Also welded to the lower face of pan bottom 6 is a short depending collar 18 circumscribing the nipple 12 and arranged to seat on the upper end of the nipple 16. The height or depth of the collar 18 preferably should be greater than the height of the lugs 7 and fingers 8 thereby to provide a central support for the pans, the lugs and fingers merely serving as hold downs for the ends of the pans.

Mounted on each of the drumheads 2 in radial alignment with each of the pan fingers is a toggle latch generally designated by the reference numeral 19. As best shown in Figures 7 and 8, each toggle latch includes an internally threaded sleeve 21 welded to the drumhead and arranged to receive a stud 22. Journaled on the stud 22 and retained thereon by a cotter pin 23 is an operating lever 24. Pivoted to the lever 24 intermediate its ends is the lower end of a semicircular toggle link 25 and pivoted to the upper end of the link 25 is a threaded pin 26. Screwed to the pin 26 is a latching hook 27 arranged in the open position of the toggle latch to be disposed immediately over the protruding end of one of the radially aligned fingers all as indicated in dot-dash line in Figure 8. Upon the clockwise rotation of the lever 24 from its dot-dash position to its full line position the hook 27 moves downwardly into contact with the finger 8 and then pulls the finger into seating engagement with the drum 1. At this point the link 25 has passed its dead center position and serves to hold its pan in its operative position with its nipple 12 sealed within the upper end of the nipple 16.

The filtrate manifold communicates through suitable piping 28 extending through the filter drum and through one of the trunnions 3 with the automatic valve of the filter all in a manner well known to the industry.

Circumscribing the side walls of each of the filtrate pans 6 is an outwardly facing channel 31 and spot welded to and over each pan is a filter medium supporting screen 32. Surrounding the rough marginal edges of the screen 32 is a plastic seal strip or coat 33 and mounted over the channel 31 is an undercut plastic caulking channel 34. Disposed over the supporting screen 32 is a sheet 35 of filter medium, the marginal edges of which are tucked into the caulking channel and firmly secured therein by a caulking strip 36 such as a section of rope or other suitable material.

It will be seen that as a result of this construction I have provided a filter drum made of a plurality of independent filtrate pans any one of which can be readily removed and replaced upon the failure of its filter medium, with a minimum loss of operating time.

The modification of my invention illustrated in Figs. 9 to 15 inclusive differs from that above described with reference to Figs. 1 to 8 inclusive, in that instead of using a complete drum cylinder as a frame for supporting the independent filtrate pans, the pans are supported on a central annular filtrate collector and readily detachably secured thereto through a spider structure associated with each end of the filter.

More specifically, this latter modification comprises a fabricated steel hollow shaft generally designated by the reference numeral 41 arranged to be journaled in suitable bearings mounted on the ends of an associated filter pan or tank. Bolted or otherwise secured to the lefthand end of the shaft 41 as viewed in Fig. 9 is a set of radially extending spokes 42 conveniently made of channel members. Welded to and circumscribing the lefthand set of spokes as viewed in Figure 9 is an end ring 43 provided with a downwardly extending side flange 44. Affixed to the side flange 44 (Figs. 9 and 10) in radial alignment with each of the spokes 42 are a plurality of inwardly turned fingers 45.

Mounted on the hollow shaft 41 intermediate its ends is a second set of radial spokes 46, of channel cross-section, and welded to their outer ends is a ring of contiguous filtrate boxes 47 each including a top 48, a bottom 49, side walls 50 and common partitions 51.

Welded to the top of each of the filtrate boxes 47 and extending therethrough is a pair of transversely spaced filtrate nipples 52 and 53, the latter being provided with an elbow 54 inclined rearwardly with respect to the direction of rotation of the filter. As best shown in Fig. 15, the upper end of each of the filtrate nipples 52 and 53 is formed with a tapered gasket seat 55.

Connected to each of the nipples 52 and 53 are filtrate conduits 55a arranged to communicate with an automatic filter valve not shown.

Mounted on the right hand end of the shaft 41 as viewed in Fig. 9 is a third set of radially extending channel shaped spokes 56 and welded to the ends thereof is a pair of parallel rings 57 (Fig. 14). Welded to the outer ring 57 is a sleeve 58. Extending through each sleeve 58 and through each spoke is a bolt 59 secured thereto by nuts 61 and 62. Journaled on the outer end of the bolt 59 is a first class operating lever 63 (Figs. 12 and 14) and pivoted to the lower end of the lever 63 is one end of an arcuate toggle link 64. Pivoted to the free end of the link 64 is a longitudinally adjustable hook 65.

Mounted over the structure thus far described is a plurality of contiguous, generally rectangular filter pans, generally designated by the reference numeral 66. As best shown in Figs. 13 and 15, each pan includes side and end walls 67 and a bottom 68. Welded to the bottom 68 of each pan intermediate its end and in vertical alignment with each transversely spaced pair of nipples 52 and 53 is a rectangular stiffening plate 69. Extending through each of these plates in axial alignment with each of the nipples 52 and 53 and in communication with each of the filter pans 66 is a pair of nipples 71, the lower ends of these nipples being of reduced diameter so as to mate with the nipples 52. Formed intermediate the ends of each of the nipples 71 is a shoulder 72 arranged to seat on the upper ends of its mating nipple 52 and formed on the outer face of each of the nipples 71 below shoulders 72 thereof is a channel 73 arranged to receive an O-sealing ring 74. Disposed between the tapered upper end 55 of each nipple 52 and the shouldered or undercut portion of its mating nipple 71 is another O-ring 75.

From this construction it will be seen that each of the filter pans 66 is supported intermediate its ends on one of the filtrate boxes 47, these boxes being in turn supported by the filter shaft 41 through the radial central set of radial spokes 46. The mating nipples 52 and 71 and their associated O-rings serve to effect a quickly detachable water seal between the filter pans and the filtrate boxes 47, the boxes 47 serving to establish communication between the nipples 52 and the filtrate conduits 55a which in turn communicate with the automatic filter valve.

Fixed to the lefthand end of the bottom of each of the filter pans 66 in radial alignment with one of the overturned fingers 5 is an offset or undercut finger 76 arranged to be hooked beneath its associated finger 45 while the pan 66 is held in an inclined position and before the filter pan nipples 71 are brought into registration and sealing engagement with their associated filtrate box nipples 52.

Secured to the righthand end of each of the filter pans 66 in radial alignment with the adjacent hook 65 (Fig. 9) is an undercut or offset finger 77, the outer free end thereof being closed by a U-shaped plate 78.

After the lefthand end of each filter pan 66 has been properly positioned with the two fingers 45 and 76 in operative engagement with each other and the filter pan has been rotated clockwise so that the filter pin nipples 71 seat on the filtrate pan nipples 52 and 53, the toggle hook 65 is hooked over the adjacent undercut finger 77 and the toggle lever 63 is rotated clockwise to its locked position over dead center as shown in Fig. 12. By this means the pan in question can be firmly but readily detachably secured to its supporting structure in a horizontal position and sealed to its associated filtrate box.

The bottom of each of filter pans is inclined to its filtrate nipples 52 and 53 so as to provide proper drainage and each pan is provided with a filter medium supporting grid 81. Also, each filter pan is provided along its upper periphery with an outwardly facing undercut channel for the reception of the marginal edges of a section of filter medium and for the reception of a caulking strip, the caulking strip as previously explained serving to lock the filter medium to and over its associated filter pan.

In this latter modification, the filter pans are supported by and readily detachably secured to a skeleton framework rather than to a complete cylindrical drum as in the first modification. In both modifications, the filter pans in effect form a drum and in both modifications the same type of fastening means has been used for detachably securing the filter pans to their supporting structure and for effecting a watertight connection between the filter pans and the filtrate conduits leading to the automatic filter valve.

The drum 1 in the first modification as well as the end and center spiders and their associated elements of the second modification can be considered as a supporting structure for the pans. In both modifications, the pans are supported centrally thereof on their supporting structure, in both modifications both ends of each pan are readily detachably held or clamped to their supporting structure by hold down devices, in both modifications a filtrate manifold is carried by the supporting structure and in both modifications means are provided for readily detachably effecting a watertight seal between each pan and its associated filtrate manifold.

I claim:

1. A rotary drum filter comprising: a filter shaft; a circular compartmented filtrate conduit carried by said shaft intermediate its ends; contiguous longitudinally extending filtrate pans supported on said conduit, said pans being sealed to said conduit by coaxial mating rigid nipples respectively secured to said pans and said conduit and arranged to be coupled to each other by mere coaxial movement relative to each other; rings supported on each end of said shaft; means associated with said rings and with both ends of said pans for detachably securing the ends of said pans to said rings.

2. A rotary drum filter such as defined in claim 1 wherein said means associated with one of said rings for detachably securing said pans to said ring includes a toggle link.

3. A rotary filter drum comprising: a rotary shaft; a drum supporting structure mounted on said shaft; a plurality of longitudinally extending, laterally contiguous filter pans supported intermediate their ends on said supporting structure; coaxial mating nipples carried respectively by said supporting structure and said pans, said nipples being arranged to be quickly detachably coupled by the mere coaxial movement of each pair of coaxial nipples; means for effecting a watertight seal between each mating pair of nipples; longitudinally extending undercut fingers mounted on the end of each filter pan, each of said fingers being arranged to be engaged beneath an adjacent ledge fixed to said supporting structure to detachably lock the said end of its associated filter pan to said supporting structure; a toggle link actuated hook mounted on said supporting structure adjacent the opposite end of each of said pans, each of said hooks being arranged to engage a mating ledge fixed to said pan.

4. A rotary filter drum assembly comprising: a cylindrical supporting shell; a circle of peripherally spaced radially extending rigid first nipples carried by said supporting shell intermediate the ends thereof; a plurality of coaxial filter pans supported on said nipples, each of said pans being provided with a radially extending rigid second nipple arranged to mate with one of said first nipples and to form a watertight seal therewith, each pair of mating nipples being arranged to be coupled to each other by the mere relative axial movement thereof towards each other; hold down means associated with each end of each pan and adjacent portions of said supporting shell for readily detachably and independently clamping each end of each pan to said shell; and means associated with each of said pans for securing a filter medium thereto independently of every other filter pan.

5. A rotary filter drum assembly comprising: first, second and third coaxial supporting spiders; an annular filtrate conduit carried by said second supporting spider coaxially therewith; a plurality of peripherally spaced, radially extending rigid first nipples carried by said filtrate manifold, said nipples lying on a common ring concentric with said supporting spiders; a plurality of filter pans supported on said first nipples, each of said pans being provided with a radially extending rigid nipple arranged to mate with one of said first nipples and to effect a watertight seal therewith, each pair of mating nipples being arranged to be coupled to each other by the mere relative axial movement thereof towards each other; quickly detachable, interengaging hold down means associated with one end of each of said pans and an adjacent portion of said first supporting spider for clamping said one end to said first supporting spider; and quickly detachable interengaging hold down means including toggle link clamps associated with said third supporting spider for detachably clamping the opposite ends of each filter pan to said third supporting spider thereby to form of said pans a substantially cylindrical filtering drum; and means associated with each of said pans for securing a filter medium thereover independently of every other of said pans.

References Cited in the file of this patent

UNITED STATES PATENTS

| | | |
|---|---|---|
| 1,111,275 | Spence | Sept. 22, 1914 |
| 1,878,998 | Akins | Sept. 27, 1932 |
| 2,383,235 | Brown | Aug. 21, 1945 |
| 2,388,828 | Chaplin | Nov. 13, 1945 |
| 2,471,932 | Chaplin | May 31, 1949 |

FOREIGN PATENTS

| | | |
|---|---|---|
| 115,030 | Australia | April 17, 1942 |